United States Patent
Ferrer et al.

(10) Patent No.: US 10,915,663 B1
(45) Date of Patent: Feb. 9, 2021

(54) SYSTEMS AND METHODS FOR PROTECTING DATA

(71) Applicant: Facebook, Inc., Menlo Park, CA (US)

(72) Inventors: Cristian Canton Ferrer, Sammamish, WA (US); Brian Dolhansky, Seattle, WA (US); Phong Dinh, Redmond, WA (US); Bryan Wu, Seattle, WA (US); Zhen Ling Tsai, Seattle, WA (US); Eric Erkon Hsin, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 107 days.

(21) Appl. No.: 16/261,112

(22) Filed: Jan. 29, 2019

(51) Int. Cl.
| | |
|---|---|
| *G06K 9/00* | (2006.01) |
| *G06F 21/62* | (2013.01) |
| *G06N 3/08* | (2006.01) |
| *G06K 9/62* | (2006.01) |

(52) U.S. Cl.
CPC ..... *G06F 21/6254* (2013.01); *G06K 9/00241* (2013.01); *G06K 9/00288* (2013.01); *G06K 9/6257* (2013.01); *G06N 3/08* (2013.01)

(58) Field of Classification Search
CPC ...... G06F 21/6254; G06F 21/00; G06F 21/14; G06F 21/31; G06F 21/6218; G06F 21/6245; G06F 21/566; G06F 21/6227; G06F 9/542; G06F 17/18; G06F 17/15; G06F 16/903; G06F 40/284; G06F 40/30; G06F 40/216; G06F 40/00; G06K 9/00241; G06K 9/00288; G06K 9/6257; G06K 9/6256; G06K 9/6296; G06K 9/00664; G06K 9/6274; G06K 9/3258; G06K 9/342; G06K 9/627; G06K 9/46; G06K 9/4628; G06K 9/6218; G06K 9/6267; G06K 9/6281; G06K 9/00671; G06K 2209/01; G06Q 10/1091; G06Q 10/20; G06N 3/08; G06N 3/0445; G06N 3/0454; G06N 3/084; G06N 3/02; G06N 3/086; G06N 3/088; G06N 3/082; G06N 3/0418; G06N 3/0427; G06N 3/0481; G06N 20/00; G06N 7/005; G05B 13/048; G16H 50/20; G16H 50/30; G06T 2207/20084; G06T 2207/20092; G06T 2207/20101; G06T 7/11; H04L 63/0428; H04L 63/0407; H04L 63/0421; H04L 63/1433; H04L 63/1441; H04L 9/002; H04L 2209/16; G10L 15/26
See application file for complete search history.

(56) References Cited

U.S. PATENT DOCUMENTS

| | | | |
|---|---|---|---|
| 2017/0344906 A1* | 11/2017 | Wang | G06N 5/003 |
| 2018/0144246 A1* | 5/2018 | Jayadeva | G06N 3/08 |
| 2018/0248904 A1* | 8/2018 | Villella | G06N 7/005 |
| 2018/0268548 A1* | 9/2018 | Lin | G06N 3/084 |
| 2018/0349605 A1* | 12/2018 | Wiebe | G06N 3/08 |
| 2019/0273509 A1* | 9/2019 | Elkind | G06F 21/562 |
| 2019/0273510 A1* | 9/2019 | Elkind | G06F 8/74 |
| 2019/0325312 A1* | 10/2019 | Matsuo | G16H 50/20 |
| 2020/0125044 A1* | 4/2020 | Ide | G06Q 10/20 |

* cited by examiner

*Primary Examiner* — Jose L Couso
(74) *Attorney, Agent, or Firm* — Sheppard Mullin Richter & Hampton LLP

(57) ABSTRACT

Systems, methods, and non-transitory computer-readable media can be configured to train a featurizer based at least in part on a set of training data. The featurizer can be applied to at least one input to generate at least one tensor. The at least one tensor obfuscates or excludes at least one feature in the at least one input.

20 Claims, 8 Drawing Sheets

SYSTEMS AND METHODS FOR PROTECTING DATA

FIELD OF THE INVENTION

The present technology relates to the field of data privacy. More particularly, the present technology relates to techniques for automated data protection using a machine learning classifier.

BACKGROUND

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others. In some cases, the posted content may be stored by the social network. However, in some circumstances, it may be undesirable for the social network to store posted content that includes sensitive information.

SUMMARY

Various embodiments of the present technology can include systems, methods, and non-transitory computer readable media configured to train a featurizer based at least in part on a set of training data. The featurizer can be applied to at least one input to generate at least one tensor. The at least one tensor obfuscates or excludes at least one feature in the at least one input.

In some embodiments, a classifier can be trained based at least in part on a set of training tensors corresponding to the set of training data. The classifier can be applied to the at least one tensor. The at least one input can be classified based at least in part on the at least one tensor.

In some embodiments, the featurizer can comprise a first subset of stages in a convolutional neural network.

In some embodiments, the classifier can comprise a second subset of stages in the convolutional neural network.

In some embodiments, the second subset of stages comprises stages at a higher level in the convolutional neural network than the first subset of stages.

In some embodiments, the first subset of stages and the second subset of stages collectively comprise all stages in the convolutional neural network.

In some embodiments, the featurizer is trained to identify semantic components in the at least one input.

In some embodiments, the classifier is trained to classify the at least one input based at least in part on the semantic components.

In some embodiments, the featurizer can be trained to obfuscate or exclude the at least one feature.

In some embodiments, training the featurizer to obfuscate or exclude the at least one feature can comprise obfuscating or excluding the at least one feature in the set of training data prior to training the featurizer.

In some embodiments, training the featurizer to obfuscate or exclude the at least one feature can comprise training the featurizer to identify the at least one feature and obfuscate or exclude the at least one feature.

In some embodiments, an inverse featurizer can be applied to the at least one tensor. At least one recomposed input can be generated based at least in part on the at least one tensor.

In some embodiments, an efficacy of the featurizer can be determined based at least in part on the at least one input and the at least one recomposed input.

In some embodiments, the efficacy of the featurizer can be determined further based at least in part on whether the at least one feature is obfuscated or excluded in the at least one recomposed input.

In some embodiments, the efficacy of the featurizer can be determined further based at least in part on whether the at least one tensor comprises sufficient information to train a classifier.

In some embodiments, the tensor can comprise a three dimensional matrix.

In some embodiments, at least one axis of the three dimensional matrix is associated with a set of features determined by the featurizer.

In some embodiments, the at least one obfuscated or excluded feature comprises personal, personally identifiable, private, confidential, restricted, secret, illegal, or pornographic content.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
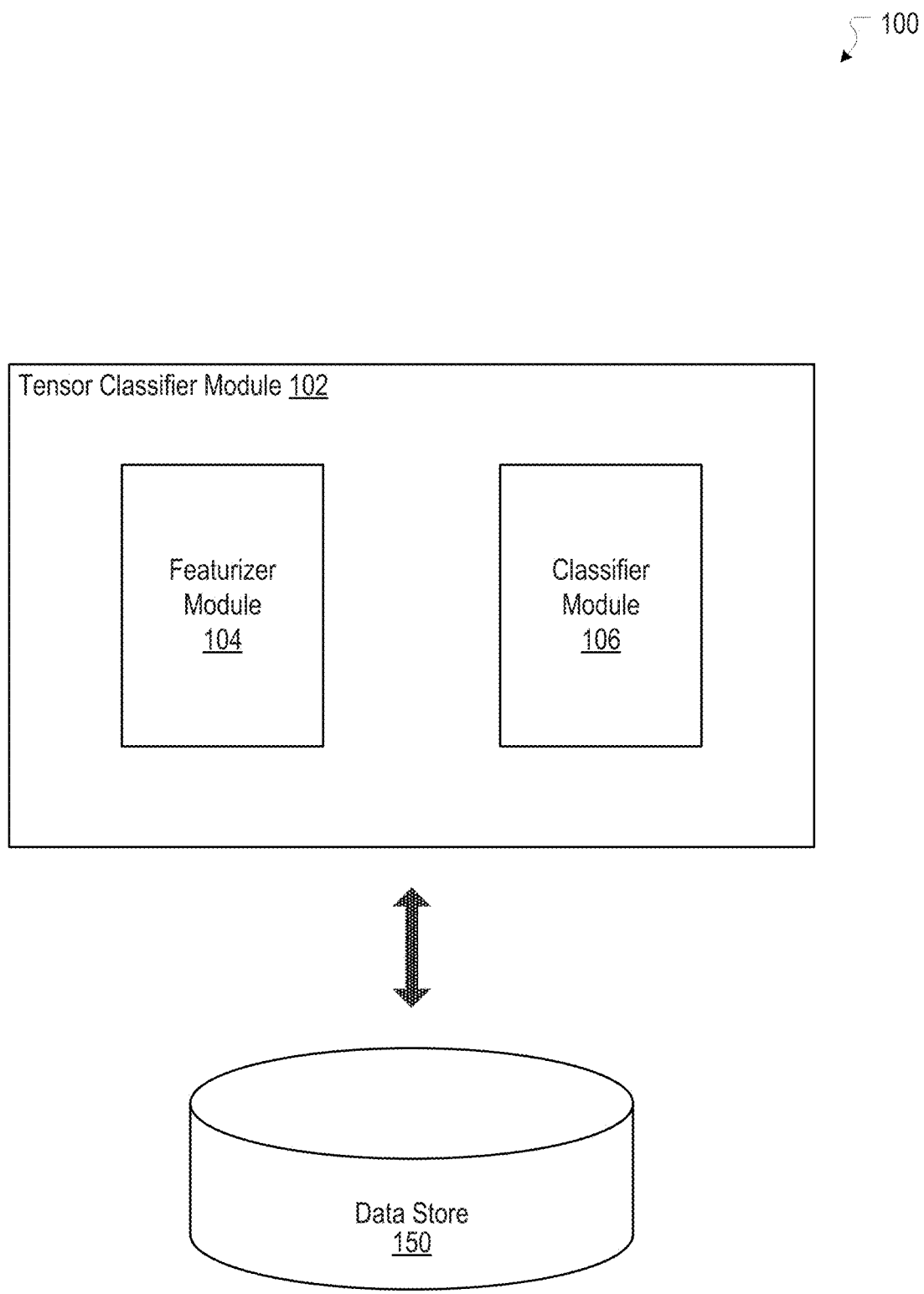
FIG. 1 illustrates an example system including an example tensor classifier module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Obfuscating Data

Today, people often utilize computing devices (or systems) for a wide variety of purposes. For example, users can use their computing devices to interact with other users, create content, share content, and view content. In some cases, users can utilize their computing devices to access a social network and post content to the social network. Content posted to the social network may include text content items and media content items, such as audio, images, and videos. The posted content may be published to the social network for consumption by others. In some cases, the posted content may be stored by the social network and utilized, for example, as training data for training a machine learning model to perform a variety of predictions or classifications. However, in some circumstances, it may be undesirable for the social network to store posted content that includes sensitive information.

Under conventional approaches, users can post content to a social network (or social networking system) and access content posted to the social network by other users. In some cases, the social network can utilize such content as training data for training a machine learning model. In general, data from various sources can be utilized as training data for training a machine learning model. Typically, large amounts of training data are needed to appropriately train a machine learning model. As such, it may be advantageous to store a large amount of data in order to have the data available to train one or more machine learning models. However, in some cases, content posted to a social network that may be used as training data for training a machine learning model may contain sensitive (e.g., personal, personally identifiable, private, confidential, restricted, secret, illegal, pornographic, etc.) information. This sensitive information may not be relevant for training a machine learning model. In addition, it may be undesirable or even, in some situations, impermissible, to store such sensitive information indefinitely. Accordingly, it would be advantageous to accumulate training data that does not contain sensitive information. However, under conventional approaches, accumulating training data that does not contain sensitive information can present significant challenges. For example, eliminating all training data that contains sensitive information may result in insufficient training data to appropriately train a machine learning model. Thus, such conventional approaches are not effective in addressing these and other problems arising in computer technology.

An improved approach rooted in computer technology overcomes the foregoing and other disadvantages associated with conventional approaches specifically arising in the realm of computer technology. In various embodiments, the present technology can utilize featurizers to generate tensors based on inputs. The featurizers can generate tensors that obfuscate or exclude sensitive information (e.g., personal, personally identifiable, private, confidential, restricted, secret, illegal, pornographic, etc.) in the inputs. A featurizer may convert an input (e.g., a content item or other set of data) into a tensor by selecting certain portions of the input for inclusion in the tensor, and excluding certain portions of the input from the tensor. For example, a featurizer may be configured to receive an image as an input, and to generate a tensor which includes data pertaining to some portions of the image, but excludes data pertaining to other sensitive portions of the image (e.g., excludes data pertaining to one or more faces depicted in the image). To generate tensors, featurizers can apply, for example, one or more machine learning techniques to obfuscate or exclude sensitive information. For example, faces may, in some cases, be considered sensitive information and a featurizer can be trained to generate tensors that obfuscate faces. As just one example, the trained featurizer can be applied to a self-portrait image (i.e., a selfie) to generate a tensor. In certain embodiments, a tensor may be stored as a representation of the original input, and in a format different from the original input. For example, in the example of a self-portrait image, the tensor can be a non-visual representation of the self-portrait image wherein information related to faces is obfuscated. In various embodiments, the present technology can utilize tensors as training data for training machine learning models. Continuing the above example, a featurizer trained to obscure or exclude faces can be applied to a set of self-portrait images to generate a set of tensors. This set of tensors can be utilized as training data for training a machine learning model to, for example, identify self-portrait images. In this example, the set of tensors can be stored instead of the set of self-portrait images. Accordingly, the machine learning model can be trained without maintaining for an undue duration of time training data that contains sensitive information. Generating tensors based on the present technology allows for the accumulation of training data suitable for training machine learning models without accumulation of sensitive information. Additional details relating to the disclosed technology are provided below.

FIG. 1 illustrates an example system 100 including an example tensor classifier module 102, according to an embodiment of the present technology. As shown in the example of FIG. 1, the tensor classifier module 102 can include a featurizer module 104 and a classifier module 106. In some embodiments, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details.

In some embodiments, the tensor classifier module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some embodiments, the tensor classifier module 102 can be, in part or in whole, implemented within or configured to operate in conjunction with or be integrated with a social networking system (or service), such as a social networking system 630 of FIG. 6. Likewise, in some instances, the tensor classifier module 102 can be, in part or in whole, implemented within or configured to operate in conjunction with or be integrated with a client computing device, such as the user device 610 of FIG. 6. For example, the tensor classifier module 102 can be implemented as or within a dedicated application (e.g., app), a program, or an applet running on a user computing device or client computing system. The application incorporating or implementing instructions for performing functionality of the tensor classifier module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The tensor classifier module 102 can be configured to communicate and/or operate with the at least one data store 150, as shown in the example system 100. The at least one data store 150 can be configured to store and maintain various types of data including, for example, generated tensors. In some implementations, the at least one data store 150 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 150 can store information associated with users, such as user identifiers, user information, profile information, user specified settings, content produced or posted by users, and various other types of user data.

In various embodiments, the featurizer module 104 can utilize one or more featurizers to generate tensors based on inputs. In general, featurizers identify various features in inputs and generate tensors that comprise information describing at least a subset of the various features. The generated tensors are new representations of the inputs and, in some cases, may be of a different type of data from the inputs. For example, a tensor generated based on an image file input may be a non-visual representation of data contained within the image file. Featurizers can be configured to generate tensors such that one or more features in the inputs are obfuscated or excluded in the generated tensors. In some embodiments, the featurizer module 104 can utilize one or more machine learning techniques to generate tensors. For example, a featurizer can comprise a machine learning model trained to obfuscate or exclude a particular feature. For example, a featurizer may be trained to obfuscate or exclude faces or other sensitive information that may be depicted in an image. The featurizer can be applied to an input such that the particular feature in the input can be obfuscated or excluded in the generated tensor. To determine an efficacy of a featurizer in generating a tensor that has obfuscated or excluded a particular feature, an inverse featurizer can be applied to the tensor to generate a recomposed input. The efficacy of the featurizer can be determined based in part on the recomposed input. More details regarding the featurizer module 104 will be provided below with reference to FIG. 2.

In various embodiments, the classifier module 106 can train machine learning models to perform various predictions or classifications based on training tensors. In general, training tensors are tensors generated from training data. Such training tensors can comprise sufficient information to be suitable for training machine learning models while excluding one or more features in the training data from which the training tensors were generated. In some embodiments, the classifier module 106 can apply one or more trained machine learning models to an input tensor to classify an input from which the input tensor was generated. For example, a featurizer may be applied to an input to generate an input tensor based on the input. A trained machine learning model can be applied to the input tensor to classify the input tensor and, accordingly, the input from which the input tensor was generated. For example, if a machine learning model is trained to identify self-portrait images, the machine learning model can receive an input tensor generated from an image, and the machine learning model can be configured to determine whether or not the image was a self-portrait image based on the input tensor. More details regarding the classifier module 106 will be provided below with reference to FIG. 3.

Figure 2:
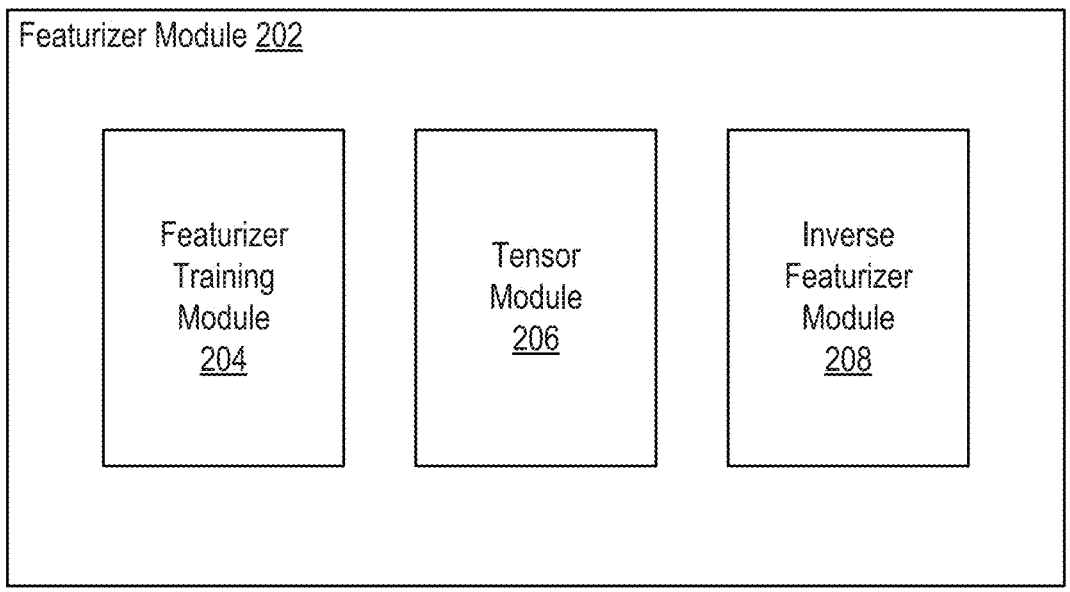
FIG. 2 illustrates an example of a featurizer module, according to an embodiment of the present technology.

FIG. 2 illustrates an example of a featurizer module 202 configured to utilize one or more featurizers to generate tensors based on inputs. In some embodiments, the featurizer module 104 of FIG. 1 can be implemented as the featurizer module 202. As shown in FIG. 2, the featurizer module 202 can include a featurizer training module 204, a tensor module 206, and an inverse featurizer module 208.

The featurizer training module 204 can train a featurizer to generate tensors. In general, a featurizer can be trained to identify various features in inputs and generate tensors that describe those various features. The various features may be, for example, a subset of features contained within the input. In some embodiments, a featurizer can comprise multiple layers or stages, and each layer or stage can be associated with identification of a particular feature and/or a loss of information from an input. The various features that featurizers can be trained to identify can include, for example, semantic components such as horizontal edges, vertical edges, corners, curves, lines, shapes, etc. In some cases, featurizers can be trained to determine probabilities associated with a depiction of an object, concept, topic, etc. In some embodiments, featurizers can utilize or comprise a machine learning model (e.g., convolutional neural network, recurrent neural network, deep learning network, etc.) to identify various features in an input. In an embodiment, a featurizer can be implemented as a portion of a convolutional neural network. The convolutional neural network can comprise multiple stages, and each stage can correspond to some feature to be identified in, for example, an image input. In this example, low-level stages of the convolutional neural network can correspond to edges or other semantic components identified in the image input. High-level stages of the convolutional neural network can connect information from the low-level stages to identify, for example, various objects in the image input. The featurizer can be implemented as, for example, a set of low-level stages of a convolutional neural network. In other words, the featurizer may include a set of low-level stages of a convolutional neural network, and may exclude one or more high-level stages of a convolutional neural network. Continuing the example above, a featurizer, when applied to an input image, can generate a tensor that may not contain all the information in the input image, but can comprise sufficient information to identify various objects in the input image. At the same time, because the tensor may not contain all the information in the input image, any sensitive information that may have been in the input image may be obfuscated or excluded in the generated tensor. By including one or more low-level stages of a convolutional neural network and excluding one or more high-level stages of the convolutional neural network, the featurizer generates tensors that include certain information and exclude other information. For example, the tensor may lack (e.g., exclude) certain information in order to obfuscate or exclude sensitive information in the input image.

In general, a featurizer, as described above, can contain sufficient information for a given purpose, such as to identify objects, but may not contain all the information in an input and, accordingly, may not contain sensitive information. In some embodiments, the featurizer training module 204 can train featurizers to generate tensors wherein one or more particular features are deliberately obfuscated or excluded. In some embodiments, particular features in inputs can be obfuscated or excluded prior to the inputs being used to train a featurizer. By training the featurizer with such modified inputs, the featurizer will not be trained to process the particular features. Accordingly, when the trained featurizer is applied to an input containing the particular feature, the featurizer will not process the particular feature, and will generate a tensor that obfuscates or excludes the particular feature. In some cases, a featurizer can be trained to ignore certain elements associated with a particular feature to be obfuscated or excluded. By training the featurizer to ignore certain elements associated with the particular feature, a tensor generated by the featurizer may not contain elements necessary to identify the particular feature. This may effectively obfuscate the particular feature. In other cases, a featurizer can be trained to identify a particular feature and then actively obfuscate or exclude the particular feature. By training the featurizer to identify a particular feature and then obfuscate or exclude the particular feature, a tensor generated by the featurizer may be modified such that the tensor does not contain any information relevant to the particular feature. For example, in some cases, faces in images can be considered sensitive information. In such cases, a featurizer can be trained to identify faces in an input image and generate tensors that exclude faces. Accordingly, when provided with an input image containing faces, the featurizer may generate a tensor that excludes information associated with areas in the input image that contain faces. In this example, the generated tensor may have no information in areas where the input image contained faces but would otherwise contain sufficient information to, for example, train a machine learning model to identify objects in areas where the input image does not contain faces. Thus, a featurizer can be trained to generate a tensor that contains sufficient information to describe features in an input from which the tensor was generated without containing sensitive information.

The tensor module 206 can utilize one or more featurizers to generate tensors based on inputs. In general, tensors are generated representations of inputs that describe various features in the inputs. As generated representations, tensors can be of a different type of data from the inputs from which they were generated. In some embodiments, tensors can be three-dimensional matrices. In one embodiment, as three-dimensional matrices, the X-axis and Y-axis of tensors can correspond to, for example, the coordinate locations of various features in an image or video input. The Z-axis of the tensors can correspond to, for example, various features identified in the input. For example, a tensor of an image input may be a three-dimensional matrix representation of the image input. In this example, the X-axis and Y-axis can correspond to coordinate locations in the image input. The Z-axis can correspond to various features identified in the image input. One layer in the three-dimensional matrix can describe, for example, locations of horizontal edges identified in the input image, and another layer can describe, for example, locations of vertical edges identified in the input image. Other layers can describe other semantic components of the input image. In some cases, dimensions of a tensor correspond with a complexity of a featurizer. For example, a featurizer with greater complexity may generate a tensor with larger X, Y, and/or Z axes than a featurizer with less complexity, which may generate a tensor with smaller X, Y, and/or Z axes. While various examples described herein may refer to image inputs, the principles described herein with regard to utilizing featurizers to generate tensors are not limited to image inputs. The principles described herein may be applied to other types of inputs, such as video, audio, or text inputs, to name some examples.

The inverse featurizer module 208 can apply an inverse featurizer to a tensor to generate a recomposed input which, in some embodiments, can be compared with an input to determine an efficacy of the tensor. In general, a featurizer can apply various functions to an input to determine various features in the input and generate a tensor describing those various features. An inverse featurizer can comprise inverse functions corresponding to functions of a corresponding featurizer. Accordingly, after a featurizer is applied to an input to generate a tensor, an inverse featurizer can be applied to the tensor to generate a recomposed input. In some embodiments, the recomposed input and the input can be compared to determine an efficacy of the featurizer. The efficacy of the featurizer can be evaluated based in part on whether the generated tensor comprises sufficient information for a given purpose, such as to identify objects or train a machine learning model (e.g., to train a classifier) and whether the tensor comprises sensitive information. For example, a featurizer can be applied to an input image to generate a tensor. An inverse featurizer can be applied to the tensor to generate a recomposed input image. The recomposed input image can be an image wherein various objects may be recognizable, but sensitive information would be obfuscated or excluded. In this example, the recomposed input image that comprises recognizable objects without containing sensitive information can be indicative of an effective featurizer.

Figure 3:
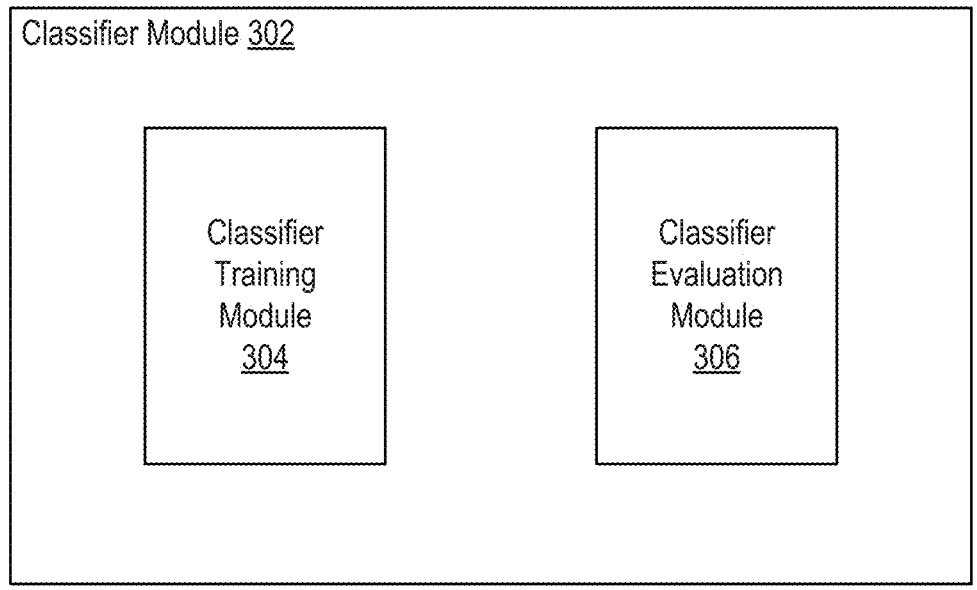
FIG. 3 illustrates an example of a classifier module, according to an embodiment of the present technology.

FIG. 3 illustrates an example of a classifier module 302 configured to train machine learning models based on training tensors and apply the machine learning models to input tensors to classify the inputs from which the input tensors are generated. In some embodiments, the classifier module 106 of FIG. 1 can be implemented as the classifier module 302. As shown in FIG. 3, the classifier module 302 can include a classifier training module 304 and a classifier evaluation module 306.

The classifier training module 304 can train one or more machine learning models (also referred to herein as one or more "classifiers") to classify an input tensor and, accordingly, an input from which the input tensor was generated. In general, machine learning models can be trained using a large amount of positively or negatively labeled training data. Such positively or negatively labeled training data can be utilized to generate positive or negative training tensors (e.g., using a featurizer that has been trained to generate tensors). These training tensors can be utilized to train machine learning models instead of the training data from which the training tensors were generated. In some embodiments, one or more machine learning models can be trained along with a corresponding featurizer. The one or more machine learning models (e.g., one or more classifiers) and the corresponding featurizer can be separate implementations. In some embodiments, the one or more machine learning models (e.g., one or more classifiers) and the corresponding featurizer can be two parts of a convolutional neural network. In one example, a convolutional neural network can be trained to classify input images based on whether the input images are a certain type of image, such as a self-portrait image (i.e., a selfie). The featurizer can correspond to lower-level stages of the convolutional neural network, which can be trained to identify certain semantic components, such as edges in the input images. The machine learning model (e.g., the classifier) can correspond to higher-level stages of the convolutional neural network, which can be trained to identify various objects based on the semantic components identified in the lower-level stages. In an embodiment, the featurizer and the machine learning model can jointly comprise all stages of the convolutional neural network. Accordingly, the featurizer can be trained to generate tensors that comprise information describing certain semantic components in the input images, and the machine learning model can be trained to classify the input images based on the tensors. In some embodiments, the classifier training module 304 can train and retrain one or more machine learning models based on new or updated training data. A featurizer can be applied to the new or updated training data to generate new or updated training tensors. The new or updated training tensors can be utilized to train or retrain a machine learning model. Accordingly, the machine learning model can be continuously trained and retrained as new or updated data is available.

The classifier evaluation module 306 can apply a trained machine learning model (also referred to herein as a "classifier") to classify an input tensor and, accordingly, an input from which the input tensor was generated. The trained machine learning model can be trained based on training tensors, such as those described above with regard to the classifier training module 304. Accordingly, the trained machine learning model can be applied to an input tensor to classify the input tensor. Based on the classification of the input tensor, a classification of an input from which the input tensor was generated can be determined. In some embodiments, the trained machine learning model can be applied to input tensors generated by a corresponding featurizer that was trained in conjunction with the trained machine learning model. For example, a machine learning model can be trained to identify inappropriate content posted to a social network. The machine learning model can be trained based on training tensors generated by a corresponding featurizer. Once trained, the corresponding featurizer can be applied to content posted to the social network to generate an input tensor. The trained machine learning model can be applied to the input tensor and identify whether the input tensor corresponds with inappropriate content. Based on the identification, it can be determined whether the content posted to the social network is inappropriate content. In this example, the corresponding featurizer may be trained to obfuscate or exclude sensitive information. Accordingly, if the content posted to the social network is determined to be inappropriate content, then the inappropriate content can be removed. The input tensor generated from the inappropriate content, which does not contain sensitive information may be retained to further train and improve the machine learning model or other machine learning models.

Figure 4A:
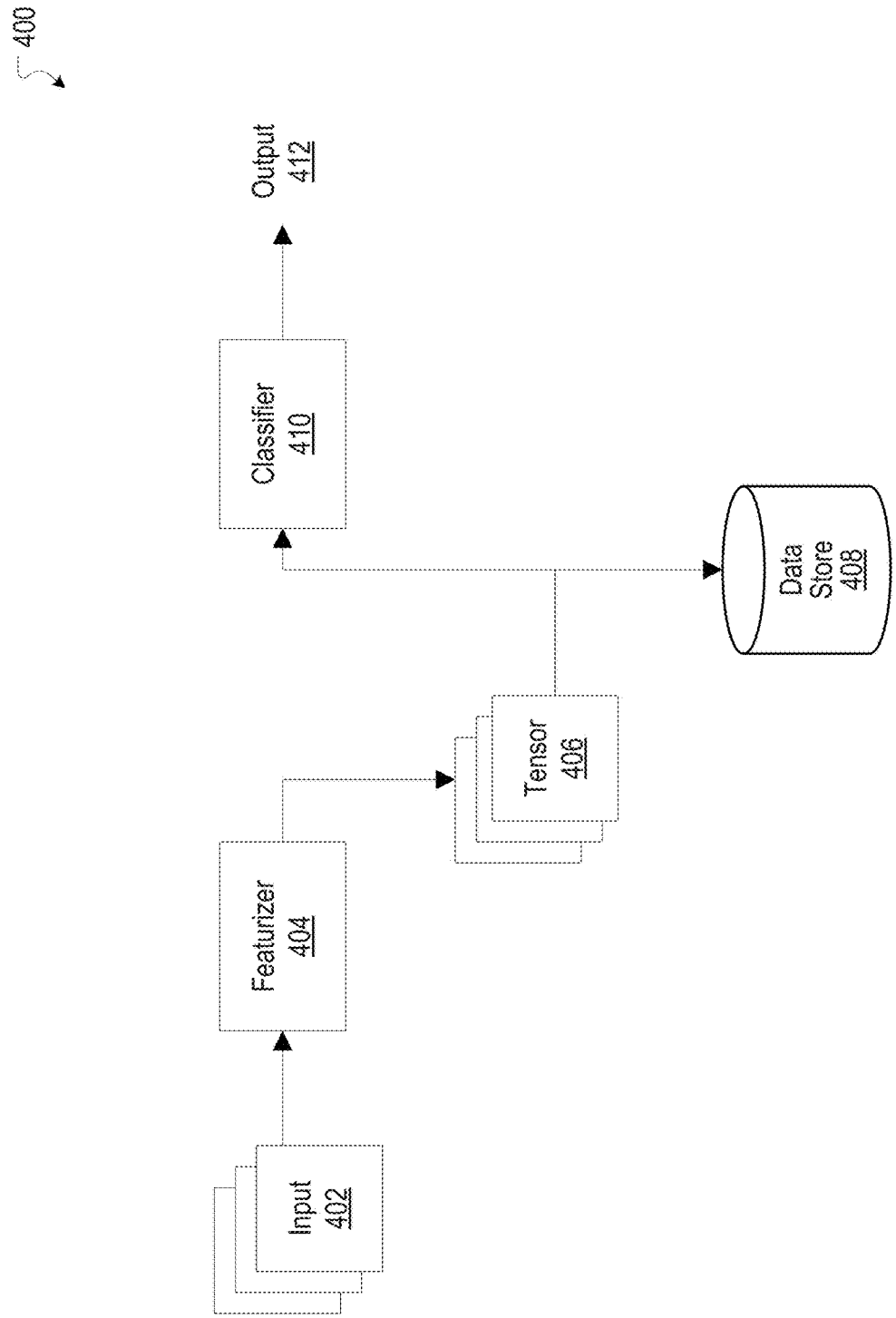
FIG. 4A illustrates an example functional block diagram, according to an embodiment of the present technology.

FIG. 4A illustrates an example functional block diagram 400, according to an embodiment of the present technology. In this example, a set of inputs 402 may contain various sensitive information, and it may be undesirable to store such information for an undue duration of time. The set of inputs 402 can be provided to a featurizer 404. The featurizer 404 can be trained to obfuscate or exclude sensitive information. The featurizer 404 can generate a set of tensors 406 based on the set of inputs 402. The set of tensors 406 can be newly generated representations of the set of inputs 402 that do not contain sensitive information. Accordingly, the set of tensors 406 can be safely stored in a data store 408. The set of tensors 406 can also be used as input for a classifier 410. The classifier 410 may be a trained machine learning model trained to classify tensors, such as the set of tensors 406. The classifier 410 can provide an output 412 which corresponds to classifications of the set of tensors 406, which accordingly, corresponds to classifications of the set of inputs 402. Thus, by utilizing the featurizer 404 and the classifier 410, classifications of the set of inputs 402 can be determined without storing sensitive information contained in the set of inputs 402. All examples herein are provided for illustrative purposes, and there can be many variations and other possibilities.

Figure 4B:
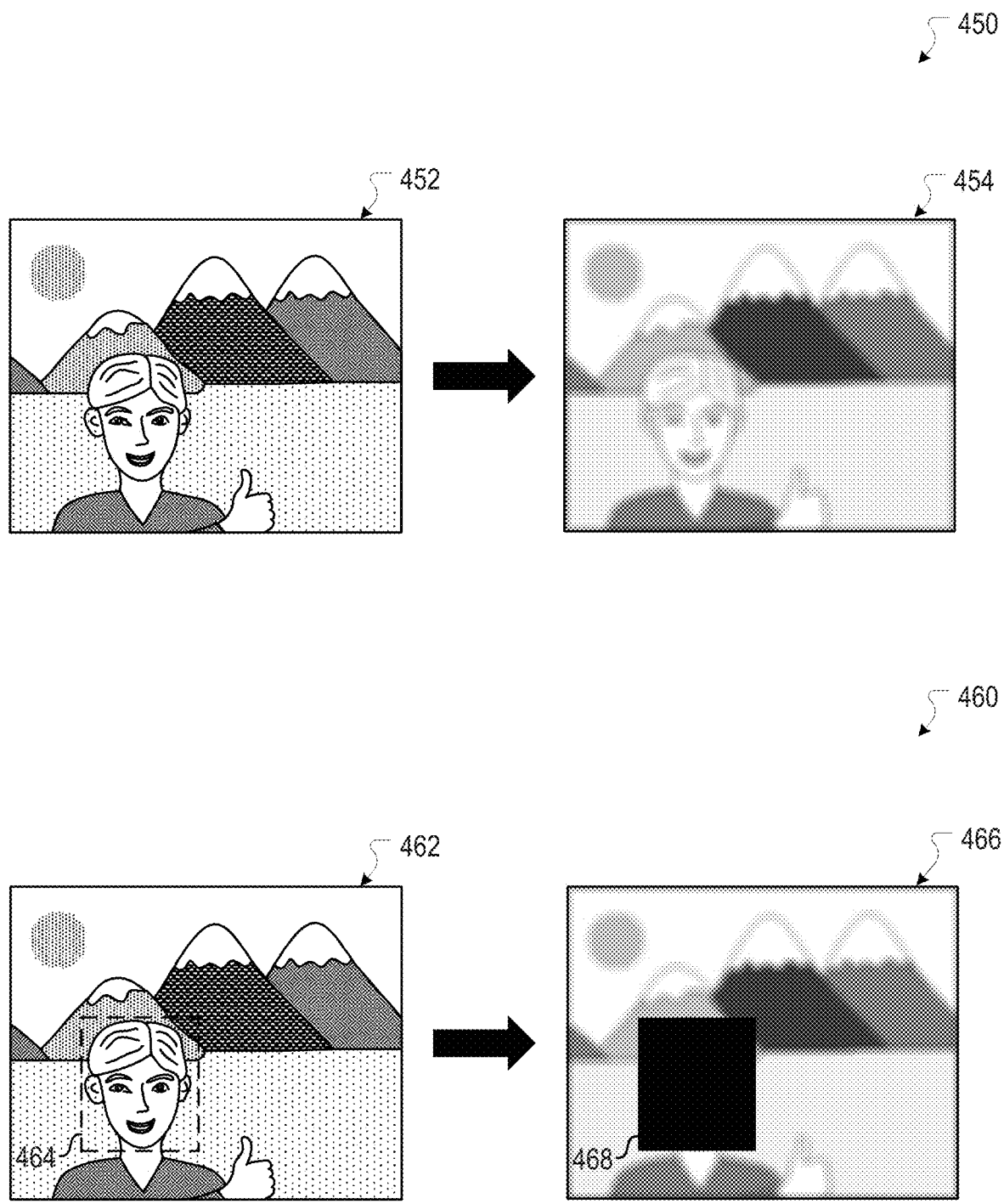
FIG. 4B illustrates an example scenario, according to an embodiment of the present technology.

FIG. 4B illustrates a first example scenario 450 and a second example scenario 460, according to an embodiment of the present technology. In the first example scenario 450, a first featurizer can be applied to a first input image 452 to generate a first tensor. Subsequently, a first inverse featurizer can be applied to the first tensor to generate a first recomposed image 454. As described above, an inverse featurizer may apply inverse functions of functions utilized in a featurizer to attempt to recompose an input provided to the featurizer. Continuing the above example, the first featurizer may not be trained to obfuscate or exclude particular features. Accordingly, the first tensor generated by the first featurizer does not obfuscate or exclude any particular features. Nevertheless, applying the first inverse featurizer to the first tensor does not wholly recompose the first input image 452. Rather, the first inverse featurizer generates the first recomposed image 454. In some cases, the first featurizer may be considered to have sufficiently obfuscated sensitive information in the input image 452.

In the second example scenario 460, a second featurizer can be applied to a second input image 462 to generate a second tensor. Subsequently, a second inverse featurizer can be applied to the second tensor to generate a second recomposed image 466. The second featurizer can be trained to exclude faces. Accordingly, the second featurizer can detect a face 464 in the second input image 462 and exclude it in the generated second tensor. As a result, applying the second inverse featurizer to the second tensor results in the second recomposed image 466 with an excluded face 468. In this case, sensitive information (i.e., faces) are wholly excluded. Both example scenario 450 and example scenario 460 depict situations wherein sensitive information can be obfuscated or excluded. All examples herein are provided for illustrative purposes, and there can be many variations and other possibilities.

Figure 5:
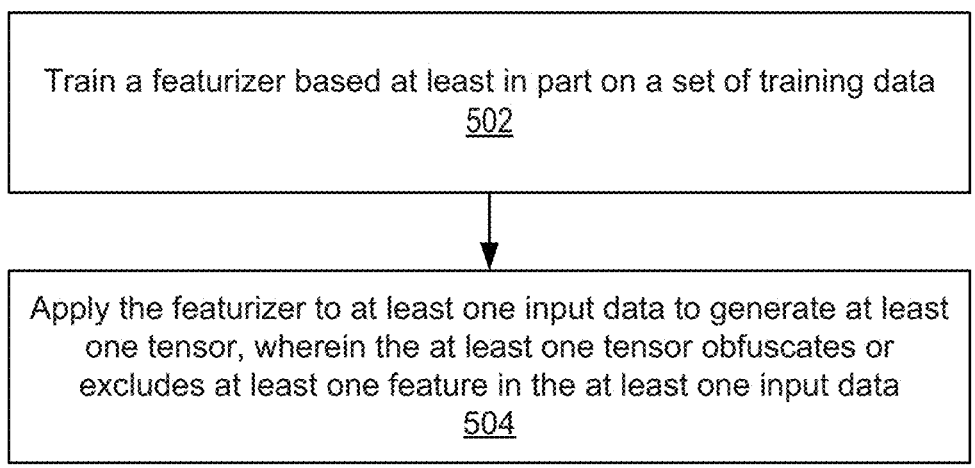
FIG. 5 illustrates an example process for generating at least one tensor, according to an embodiment of the present technology.

FIG. 5 illustrates an example method 500 for generating at least one tensor, according to an embodiment of the present technology. It should be understood that there can be additional, fewer, or alternative steps performed in similar or alternative orders, or in parallel, based on the various features and embodiments discussed herein unless otherwise stated.

At block 502, the example method 500 trains a featurizer based at least in part on a set of training data. The featurizer can be trained using one or more techniques described above with regard to the featurizer training module 204. At block 504, the example method 500 can apply the featurizer to at least one input data to generate at least one tensor, wherein the at least one tensor obfuscates or excludes at least one feature in the at least one input data. The at least one generated tensor can be, for example, a tensor as described above with regard to the tensor module 206.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
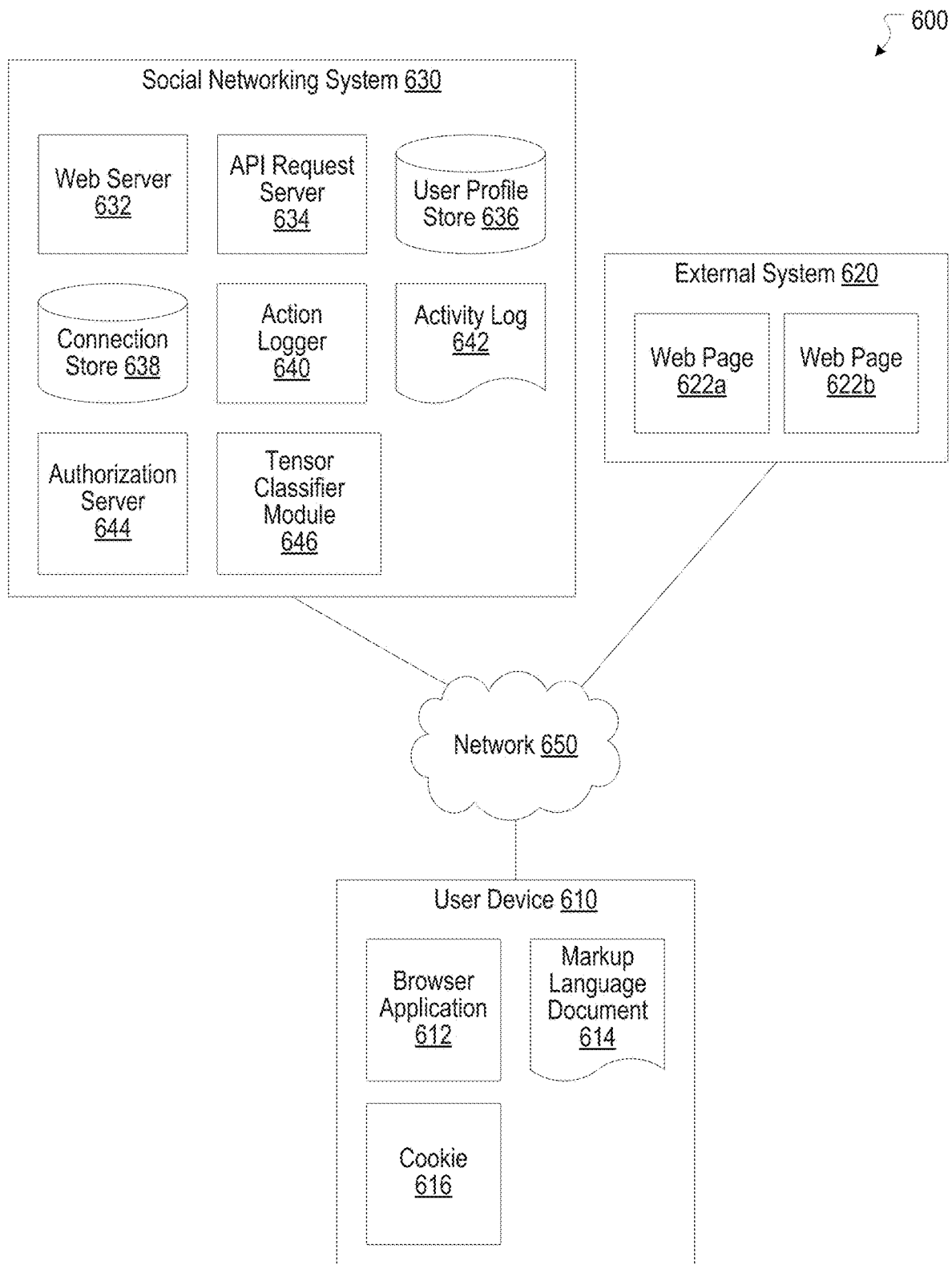
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects another user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a tensor classifier module 646. The tensor classifier module 646, for example, can be implemented as some or all of the functionality of the tensor classifier module 102 of FIG. 1. In some embodiments, some or all of the functionality of the tensor classifier module 646 can be implemented in the user device 610. As discussed previously, it should be appreciated that there can be many variations or other possibilities.

Hardware Implementation

Figure 7:
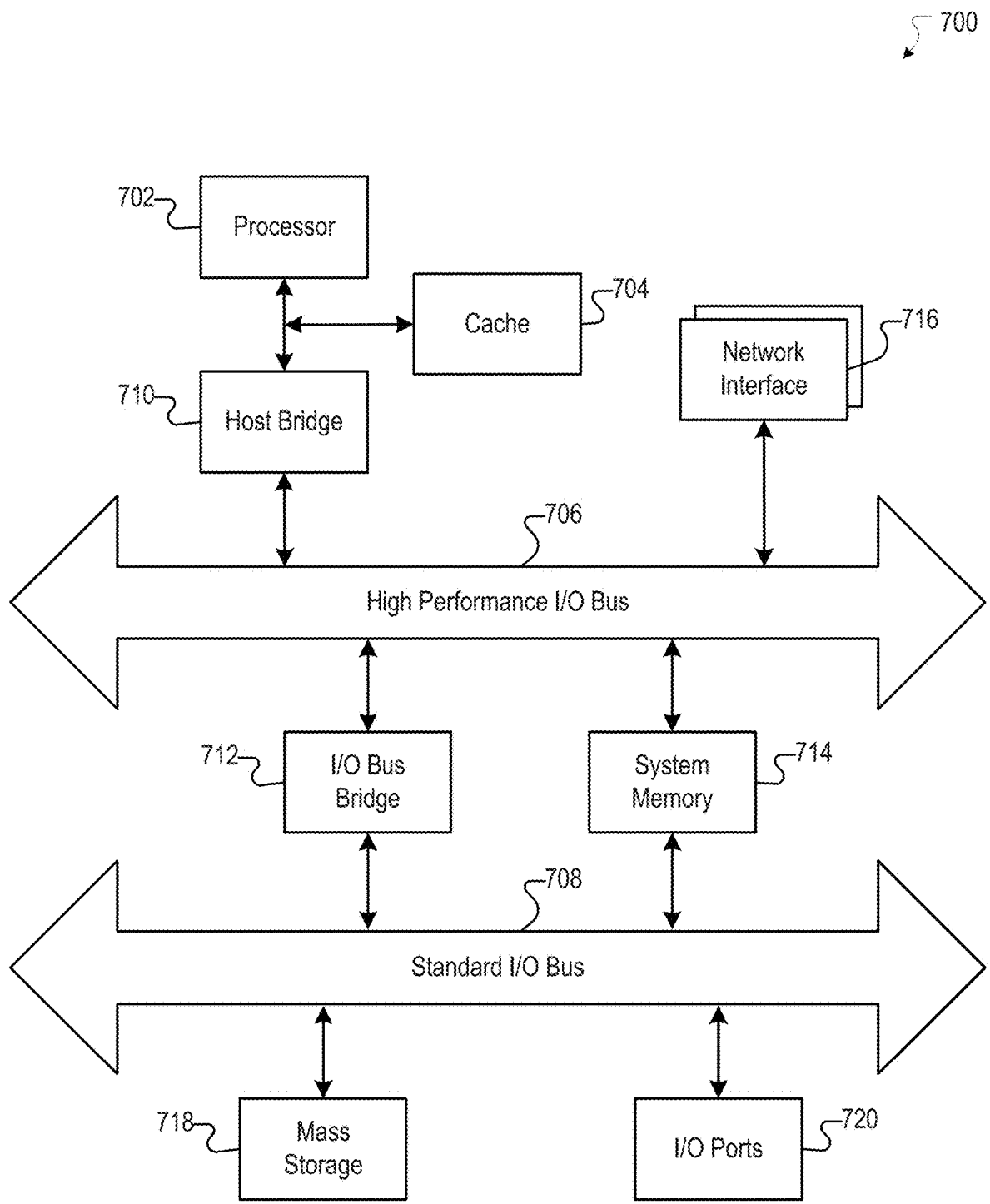
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the embodiments of the invention are intended to be illustrative, but not limiting, of the scope of the invention, which is set forth in the following claims.

What is claimed is:

1. A computer-implemented method comprising:
    training, by a computing system, a featurizer based at least in part on a set of training data;
    applying, by the computing system, the featurizer to at least one input to generate at least one tensor, wherein the at least one tensor obfuscates or excludes at least one feature in the at least one input; and
    determining, by the computing system, an efficacy of the featurizer based on at least one recomposed input generated from an inverse of the featurizer.

2. The computer-implemented method of claim 1, further comprising:
    training, by the computing system, a classifier based at least in part on a set of training tensors corresponding to the set of training data;
    applying, by the computing system, the classifier to the at least one tensor; and
    classifying, by the computing system, the at least one input based at least in part on the at least one tensor.

3. The computer-implemented method of claim 2, wherein the featurizer comprises a first subset of stages in a convolutional neural network.

4. The computer-implemented method of claim 3, wherein the classifier comprises a second subset of stages in the convolutional neural network.

5. The computer-implemented method of claim 4, wherein the second subset of stages comprise stages at a higher level in the convolutional neural network than the first subset of stages.

6. The computer-implemented method of claim 5, wherein the first subset of stages and the second subset of stages collectively comprise all stages in the convolutional neural network.

7. The computer-implemented method of claim 4, wherein the featurizer is trained to identify semantic components in the at least one input.

8. The computer-implemented method of claim 7, wherein the classifier is trained to classify the at least one input based at least in part on the semantic components.

9. The computer-implemented method of claim 1, further comprising:
    training, by the computing system, the featurizer to obfuscate or exclude the at least one feature.

10. The computer-implemented method of claim 9, wherein training the featurizer to obfuscate or exclude the at least one feature comprises:
    obfuscating or excluding, by the computing system, the at least one feature in the set of training data prior to training the featurizer.

11. The computer-implemented method of claim 9, wherein training the featurizer to obfuscate or exclude the at least one feature comprises:
    training, by the computing system, the featurizer to identify the at least one feature and obfuscate or exclude the at least one feature.

12. The computer-implemented method of claim 1, further comprising:
    applying, by the computing system, the inverse of the featurizer to the at least one tensor; and
    generating, by the computing system, the at least one recomposed input based at least in part on the at least one tensor.

13. The computer-implemented method of claim 1, further comprising:
    determining, by the computing system, the efficacy of the featurizer based at least in part on a comparison between the at least one input and the at least one recomposed input.

14. The computer-implemented method of claim 13, wherein the efficacy of the featurizer is determined further based at least in part on whether the at least one feature is obfuscated or excluded in the at least one recomposed input.

15. The computer-implemented method of claim 13, wherein the efficacy of the featurizer is determined further based at least in part on whether the at least one tensor comprises sufficient information to train a classifier.

16. The computer-implemented method of claim 1, wherein the tensor comprises a three dimensional matrix.

17. The computer-implemented method of claim 16, wherein at least one axis of the three dimensional matrix is associated with a set of features determined by the featurizer.

18. The computer-implemented method of claim 1, wherein the at least one obfuscated or excluded feature comprises personal, personally identifiable, private, confidential, restricted, secret, illegal, or pornographic content.

19. A system comprising:
    at least one processor; and
    a memory storing instructions that, when executed by the at least one processor, cause the system to perform:
        training a featurizer based at least in part on a set of training data; and
        applying the featurizer to at least one input to generate at least one tensor, wherein the at least one tensor obfuscates or excludes at least one feature in the at least one input; and
        determining an efficacy of the featurizer based on at least one recomposed input generated from an inverse of the featurizer.

20. A non-transitory computer-readable storage medium including instructions that, when executed by at least on processor of a computing system, cause the computing system to perform a method comprising:
    training a featurizer based at least in part on a set of training data;
    applying the featurizer to at least one input to generate at least one tensor, wherein the at least one tensor obfuscates or excludes at least one feature in the at least one input; and
    determining an efficacy of the featurizer based on at least one recomposed input generated from an inverse of the featurizer.

* * * * *